US012764250B2

(12) United States Patent
Kao et al.

(10) Patent No.: US 12,764,250 B2
(45) Date of Patent: Oct. 13, 2026

(54) INFORMATION HANDLING SYSTEM CAMERA WITH REFLECTION MANAGEMENT

(71) Applicant: Dell Products L.P., Round Rock, TX (US)

(72) Inventors: Chih Hao Kao, Singapore (SG); Shohrab Sheikh, Singapore (SG); Yi Hsien Lin, Taipei City (TW)

(73) Assignee: Dell Products L.P., Round Rock, TX (US)

( * ) Notice: Subject to any disclaimer, the term of this patent is extended or adjusted under 35 U.S.C. 154(b) by 240 days.

(21) Appl. No.: 18/611,928

(22) Filed: Mar. 21, 2024

(65) Prior Publication Data

US 2025/0301101 A1 Sep. 25, 2025

(51) Int. Cl.

| | |
|---|---|
| ***H04N 7/14*** | (2006.01) |
| ***G02F 1/1335*** | (2006.01) |
| ***G02F 1/13357*** | (2006.01) |
| ***H04N 7/18*** | (2006.01) |

(52) U.S. Cl.

CPC ....... *H04N 7/144* (2013.01); *G02F 1/133502* (2013.01); *G02F 1/133528* (2013.01); *G02F 1/13362* (2013.01); *H04N 7/147* (2013.01); *H04N 7/183* (2013.01)

(58) Field of Classification Search

CPC ........ H04N 7/144; H04N 7/147; H04N 7/183; G02F 1/133502; G02F 1/133528; G02F 1/13362

See application file for complete search history.

(56) References Cited

U.S. PATENT DOCUMENTS

| | | | | |
|---|---|---|---|---|
| 6,204,904 | B1 | 3/2001 | Tillin et al. | |
| 7,379,133 | B2 | 5/2008 | Iijima | |
| 7,397,525 | B2 | 7/2008 | Tago et al. | |
| 7,733,450 | B2 | 6/2010 | Kim | |
| 11,029,570 | B2 | 6/2021 | Li | |
| 2012/0327207 | A1* | 12/2012 | Oe | A61B 5/0064 348/E5.09 |
| 2023/0379567 | A1* | 11/2023 | Schaefer | G03B 17/565 |
| 2025/0184615 | A1* | 6/2025 | Chen | H04L 65/1089 |

* cited by examiner

*Primary Examiner* — Yosef K Laekemariam

(74) *Attorney, Agent, or Firm* — ZAGORIN CAVE LLP; Robert W. Holland

(57) ABSTRACT

An information handling system camera selectively activates a polarizer to polarize captured visible images so that display panel reflections are canceled from the captured visual images. The camera polarizer may be configured to polarize at an angle normal to polarized illumination from the display panel, such as when the camera integrates in a common housing with the display panel. Alternatively, the orientation of the camera retarder may rotate to find an optical orientation for cancellation of display visual image reflections.

20 Claims, 7 Drawing Sheets

INFORMATION HANDLING SYSTEM CAMERA WITH REFLECTION MANAGEMENT

BACKGROUND OF THE INVENTION

Field of the Invention

The present invention relates in general to the field of information handling system cameras, and more particularly to an information handling system camera with reflection management.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems process information with processing components disposed in a housing. Stationary systems, such as desktop and tower information handling systems have a stationary housing and typically interface with an end user through peripheral input devices, such as a peripheral display, keyboard, mouse and camera. A portable information handling system processes information with processing components disposed in a portable housing that includes an integrated display, keyboard, camera and power source to support mobile operations. Portable information handling systems also typically support interactions through peripheral devices when operating in a fixed location. For example, a portable information handling system couples to a docking station to access peripheral devices that typically offer more convenient input interfaces while continuing to support interactions with integrated I/O devices.

One common task for information handling systems is to support videoconference communications. An end user views videoconference participants at a display while a camera captures a video of the end user to communicate to other participants of the videoconference. The camera field of view is aligned with the display viewing area so that the end user appears to be looking at the other videoconference participants when viewing the display. Although the quality of videos captured by cameras can vary, the work from home era has generated a greater interest in high quality video capture so that employees present well to their customers and work teams. These improved cameras have greater pixelation and improved optics to operate in low light situations that often accompany presentations. Video conferences are often powerful tools for end users who can participate at their primary information handling system so that an array of information is available at the end user's fingertips. In some instances, end users can perform other tasks while also participating in the videoconference. Those other tasks can include sensitive work information or personal information, such as balancing a checkbook with an on-line portal. More than one end user will confess to playing a video game or two during videoconference low points.

One difficulty with the high quality visual images captured by improved cameras is that the images can include reflections of visual images presented at an end user display. For example, when an end user wears eyeglasses while viewing the display, the image of the display will typically reflect from the outer surface of the eyeglasses. The reflection is a distraction that inhibits others from making eye contact with the end user through the videoconference. The reflection can also create a security risk if video participants can capture an image of the glasses and view the visual images of the display. Reflected display images may also be readable from other surfaces, such as windows, mirrors, wall frames and other reflective surfaces. Reflections are particularly strong in low light environments.

SUMMARY OF THE INVENTION

Therefore, a need has arisen for a system and method which manages capture of reflected display visual images by a camera.

In accordance with the present invention, a system and method are provided which substantially reduce the disadvantages and problems associated with previous methods and systems for capture of visual images by a camera. A polarizer in the camera field of view cancels display visual image reflections, such as reflections on eyeglasses worn by an end user viewing the display.

More specifically, an information handling system processes information with a processor and memory, such as to execute a videoconference application. Information is presented at a display as visual images having a first polarization orientation. A camera captures visual images in a field of view aligned with a display presentation axis. The captured visual images are analyzed for reflections, such as eyeglasses worn by an end user. When reflections are detected in captured visual images, a polarizer is activated to filter the reflections by polarizing light normal to the reflections polarization, such as by activating liquid crystals to have the normal orientation polarization.

The present invention provides a number of important technical advantages. One example of an important technical advantage is that an end user wearing eyeglasses has reflections at the eyeglasses canceled out of visual images captured by a camera of the end user, such as during a video conference. The removal of reflections from eyeglasses helps to have the end user eyes visible for a better videoconference experience and removes a distraction from others viewing the videoconference.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system camera selectively activates a camera polarizer to cancel reflections of visual images displayed by the information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
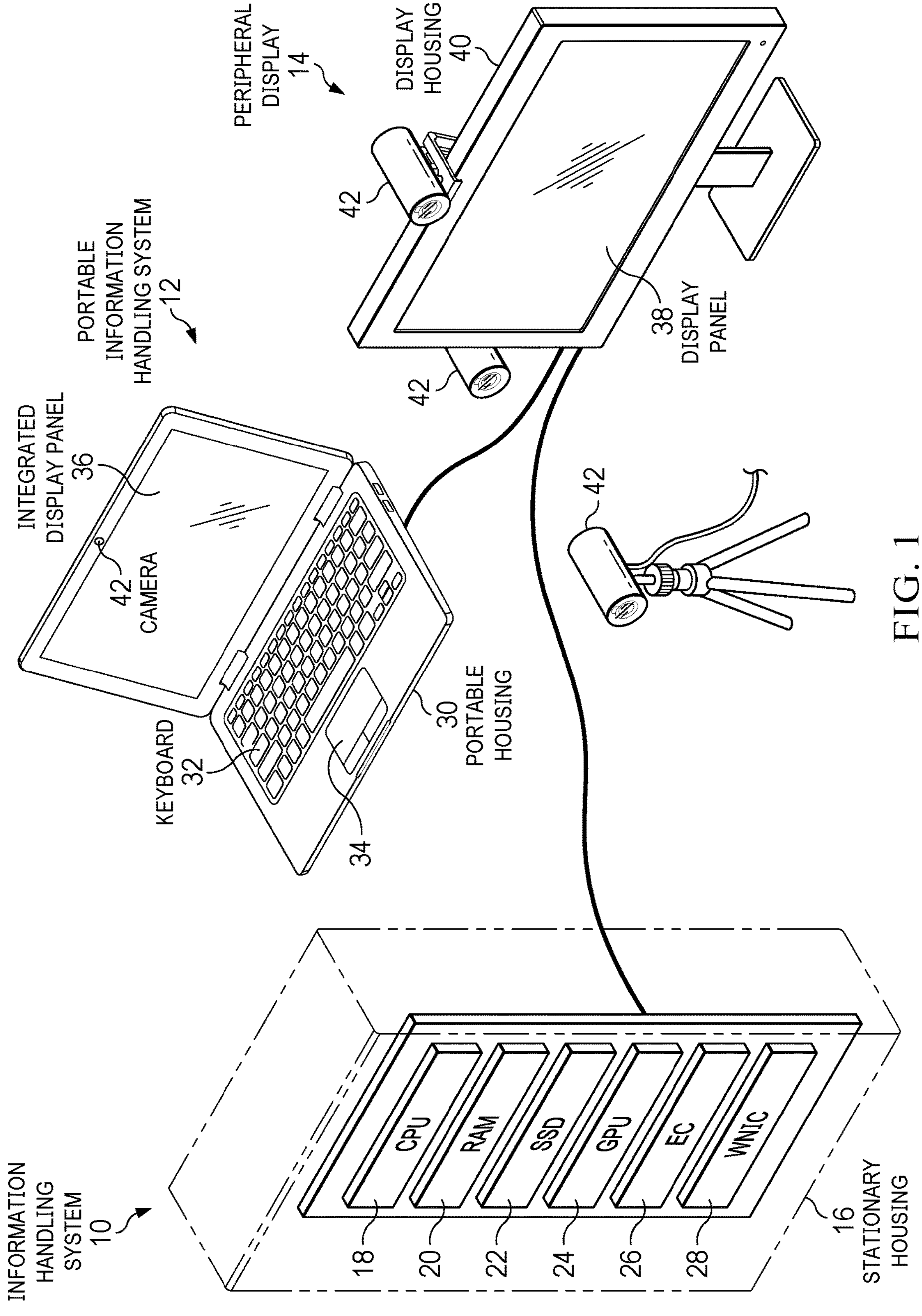
FIG. 1 depicts an information handling system that presents visual images at a display and captures visual images with a camera.

Referring now to FIG. 1, an information handling system presents visual images at a display and captures visual images with a camera. In the example embodiment, a desktop information handling system 10 and portable information handling system 12 present visual images at a peripheral display 14, such as a liquid crystal display (LCD) or organic light emitting diode (OLED) display. Desktop information handling system 10 is built in a stationary housing 16 that supports processing components that cooperate to process information. A central processing unit (CPU) 18 executes instructions to process information in cooperation with a random access memory (RAM) 20 that stores the instructions and information. A solid state drive (SSD) 22 or other non-transitory persistent storage stores an operating system and applications during power down of the system that are retrieved to RAM 20 at power up by boot instructions executing on an embedded controller 26. A graphics processing unit (GPU) 24 further processes information to generate visual images, such as pixel values that define the presentation of the visual image at a display panel having an array of pixels. A wireless network interface controller (WNIC) 28 supports communication with external devices and networks, such as through WIFI and BLUETOOTH. Portable information handling system 12 has similar processing components built into a portable housing 30 but also includes a keyboard 32, touchpad 34 and integrated display panel 36 to support mobile operations.

During normal operating conditions, desktop information handling system 10 and portable information handling system 12 process information that is presented as visual images at peripheral display 14 and/or integrated display panel 36. Peripheral display 14 generates the visual images with a display panel 38 that includes illumination of different colors to cumulatively create the image. One common operational mode involves communication by the information handling system with other information handling systems through a network interface to support a video conference. During the videoconference, participants are presented as visual images at the display panels while an end user of the information handling system has their visual images captured by a camera 42. In the example embodiment, a variety of camera configurations are depicted, including a camera integrated in portable housing, a camera integrated in display housing 40 with display panel 38, a camera having a peripheral configuration that clips onto display housing 40, and a camera having a peripheral configuration that clips on a stand resting in front of peripheral display 14. In each example, the camera is aligned to capture visual images of an end user viewing visual images presented on the display.

Figure 2:
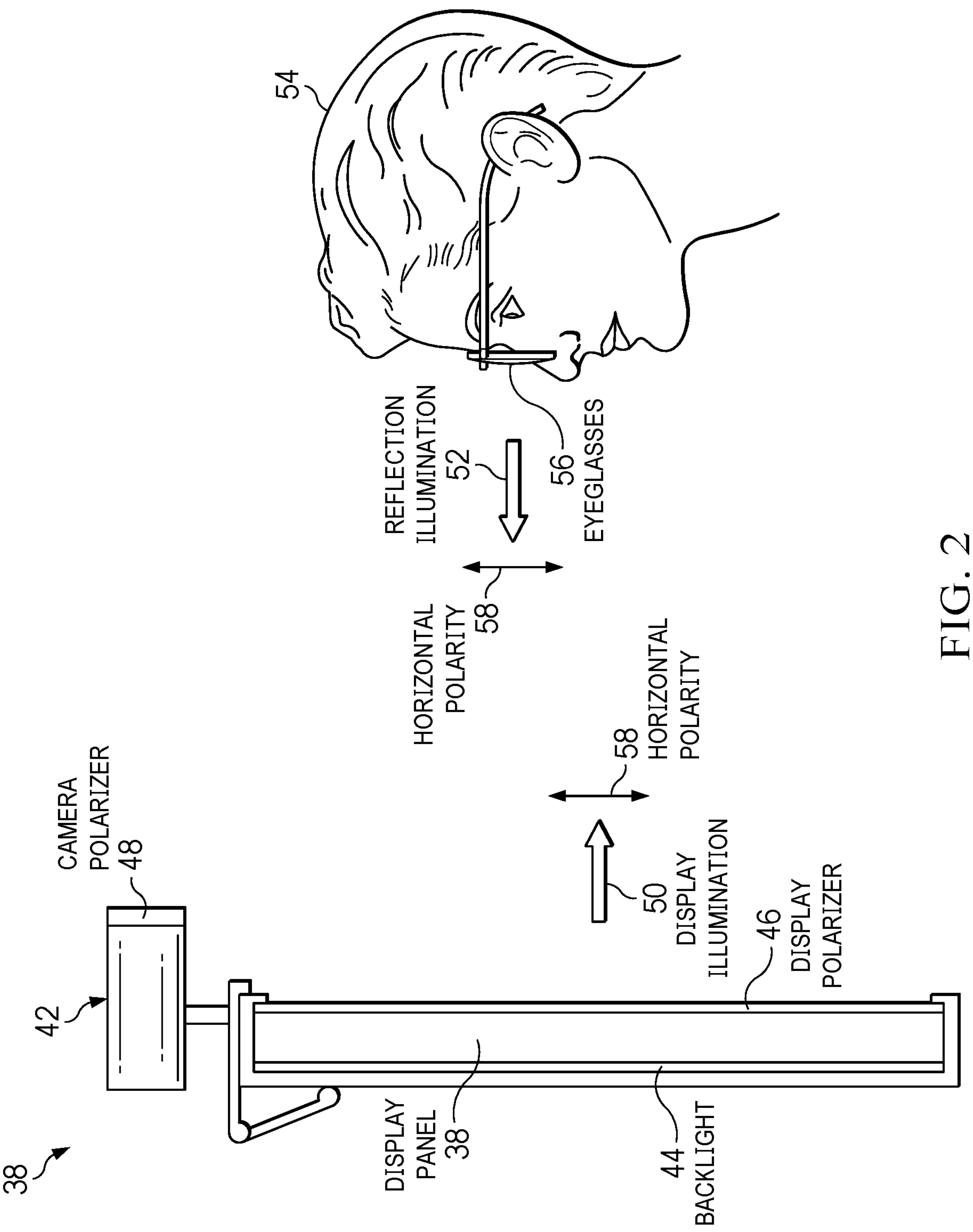
FIG. 2 depicts a side view of a camera aligned with a display presentation axis to capture visual images of an end user viewing presentation of display visual images.

Referring now to FIG. 2, a side view depicts a camera 42 aligned with a display presentation axis 50 to capture visual images of an end user viewing presentation of display visual images. In the example embodiment, display panel 38 has a backlight 44 that passes illumination through an LCD display panel 38 to generate visual images for presentation as display illumination along display presentation axis 50 to an end user 54 wearing eyeglasses 56. The display visual images are passed through a polarizer 46 that polarizes the visual image to have a certain polarity shown in the example as a horizontal polarity 58. Camera 42 aligns with display presentation axis 50 to capture visual images of end user 54 that includes reflection illumination of display visual images having the same polarity as the display light. Camera 42 includes a camera polarizer 48 through which the reflection illumination passes before the visual image is captured. When other illumination of the end user is low, reflection by eyeglasses 56 can appear quite bright to camera 42, such as so that the end user's eyes are not visible behind the eyeglasses. When camera polarizer 48 is adjusted to cancel light having the polarity of the display light, the reflection from the eyeglasses is canceled so that the end user's eyes appear visible in the camera captured visual images. In one example embodiment, logic executing on camera 42 recognizes eyeglasses 56 in the captured visual images, determines if the end user's eye are obscured by the reflection by a predetermined amount, and activates polarizer 48 to cancel the reflections when the eyes are obscured. When camera 42 integrates with display panel 38 in a shared housing, the polarity of reflection illumination 52 relative to camera 42 is known so that camera polarizer 48 can have a fixed orientation. In other situations where the camera can rotate relative to the display, camera polarizer 48 may be rotated to change how light is polarized when captured at camera 42. The logic can selectively activate camera polarizer 48 to reduce reflections and deactivate when reflections are less than a threshold, such as when ambient light is high.

Figure 3:
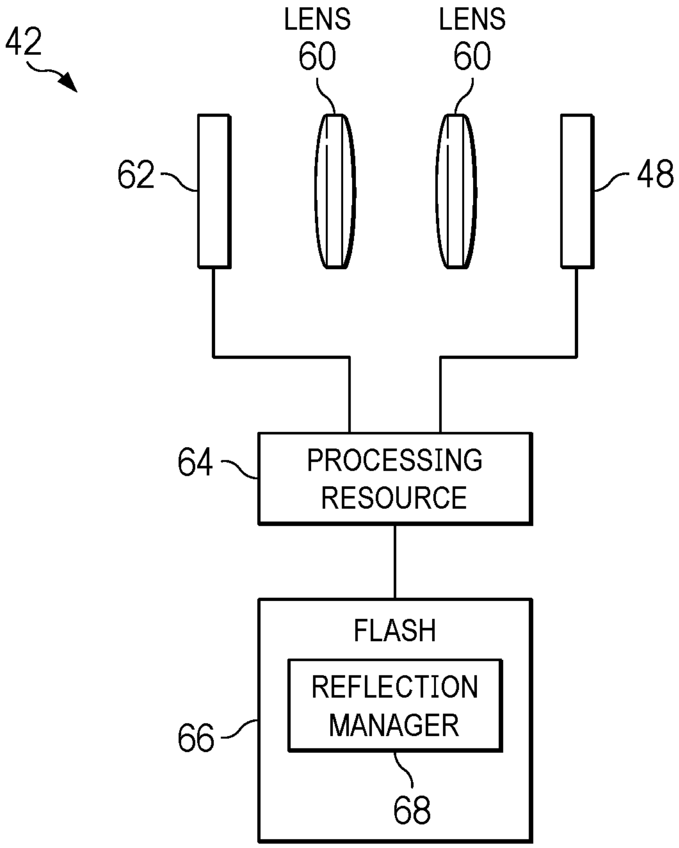
FIG. 3 depicts a side sectional view of an example camera and logic to manage reflections at captured visual images.

Referring now to FIG. 3, a side sectional view depicts an example camera and logic to manage reflections at captured visual images. An image sensor 62 captures visual images of light that passes through camera polarizer 48 and lens 60. A processing resource 64, such as an image sensor processor (ISP) processes the image data to analyze the captured visual image, such as with instructions of a reflection manager 68 stored in non-transitory flash memory 66. For example, the instructions analyze the visual image information to detect eyeglasses and then compares the eyeglasses against a threshold brightness to determine if reflections from the eyeglasses exceed the threshold. If so, the instructions activate camera polarizer 48 to reduce or cancel the reflections. In one embodiment, the orientation of the polarizer is rotated to reduce the reflected illumination to a desired level, such as 45 degrees off of the display panel polarization orientation. Alternatively, the current/charge applied to the camera polarizer is varied so that a desire amount of polarization is achieved, such as by applying charge to liquid crystals of the polarizer so that a desired amount of polarization is provided.

Figure 4:
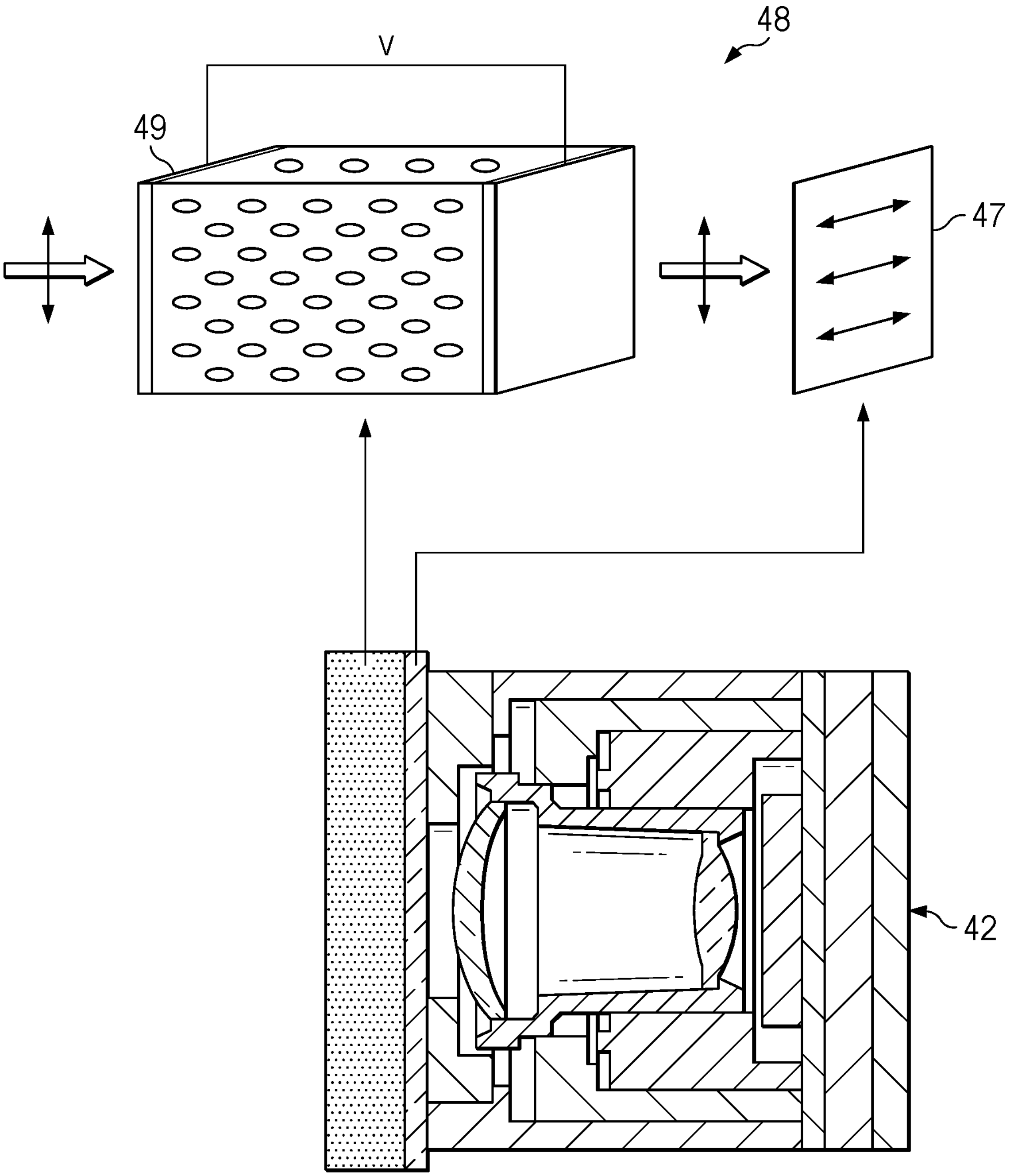
FIG. 4 depicts a side cross-sectional schematic view of one example embodiment of the polarizer.

Referring now to FIG. 4, a side cross-sectional schematic view depicts one example embodiment of polarizer 48. In the example embodiment, polarizer 48 is shown enlarged relative to camera 42 to depict an example of selective polarization of light captured by camera 42. Polarizer 48 of the example embodiment is a stack up of a liquid crystal waveplate 49 and polarizer material 47. Liquid crystal waveplate 49 has liquid crystal cells with voltage control to form a liquid crystal variable waveplate that changes the orientation of liquid crystals to adjust polarization provided by the liquid crystals. A horizontal or vertical polarizer material 47 aligned with liquid crystal waveplate 49 cooperates with polarization provided by the liquid crystals to manage light passing through polarizer 48 and into camera 42. Applying voltage across the liquid crystals creates an electrical charge that adjusts the orientation of the liquid crystals and thereby the polarization orientation of light that is allowed to pass through to the camera.

Figure 5:
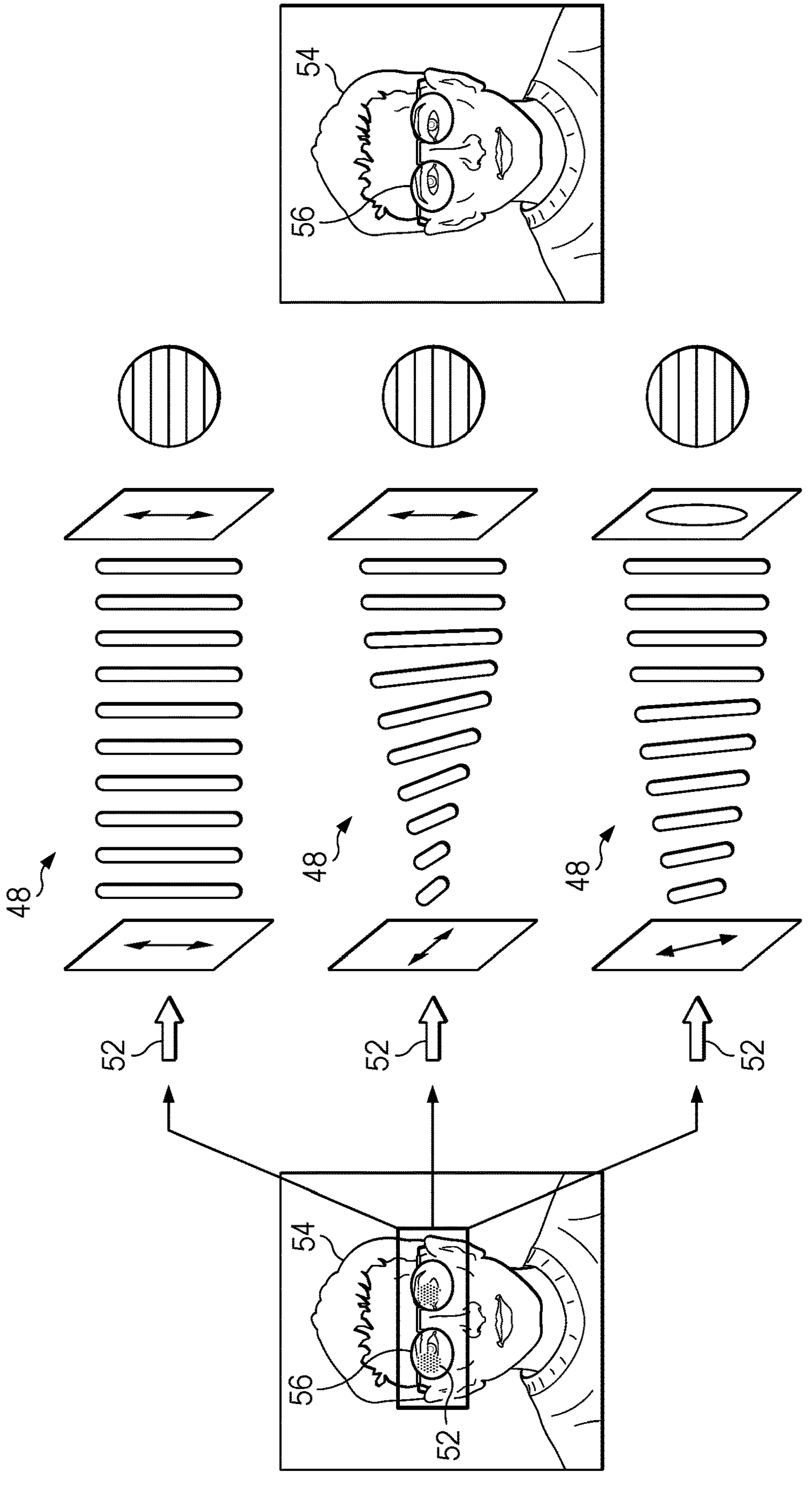
FIG. 5 depicts an illustration of varied polarization to achieve a desired reduction in reflection from end user eyeglasses.

Referring now to FIG. 5, an illustration depicts varied polarization to achieve a desired reduction in reflection from end user eyeglasses. End user 54 wearing eyeglasses 56 has reflections 52 of visual images of the display that obscure the eyes of the end user. The reflection light travels through a polarizer 48 that has liquid crystals in different orientations to selectively cancel the reflections. In the upper configuration, polarizer 48 has the same orientation as the reflected light so that none of the reflections are canceled. In this setting, the captured visual image would show the reflections on the eyeglasses in the captured visual image. In the middle configuration, the liquid crystals of polarizer 48 are oriented normal to the display polarizer orientation so that all reflected display visual image light is canceled and the visual image of the end user captured on the right side has no reflections on the eyeglasses. In the bottom configuration, the liquid crystals of polarizer 48 are rotated by 45 degrees so that a portion of the reflected light is canceled in the captured visual image. In the example embodiment, a liquid crystal polarizer of 3 mm thickness is placed at the front of the camera lens so that the impact of the polarizer on captured visual images when polarization is disabled is minimal. Changing the orientation is performed by changing the charge applied to the liquid crystals, although in an alternative embodiment, the orientation may be changed by mechanically rotating the polarizer with an actuator, such as a step motor.

Figure 6:
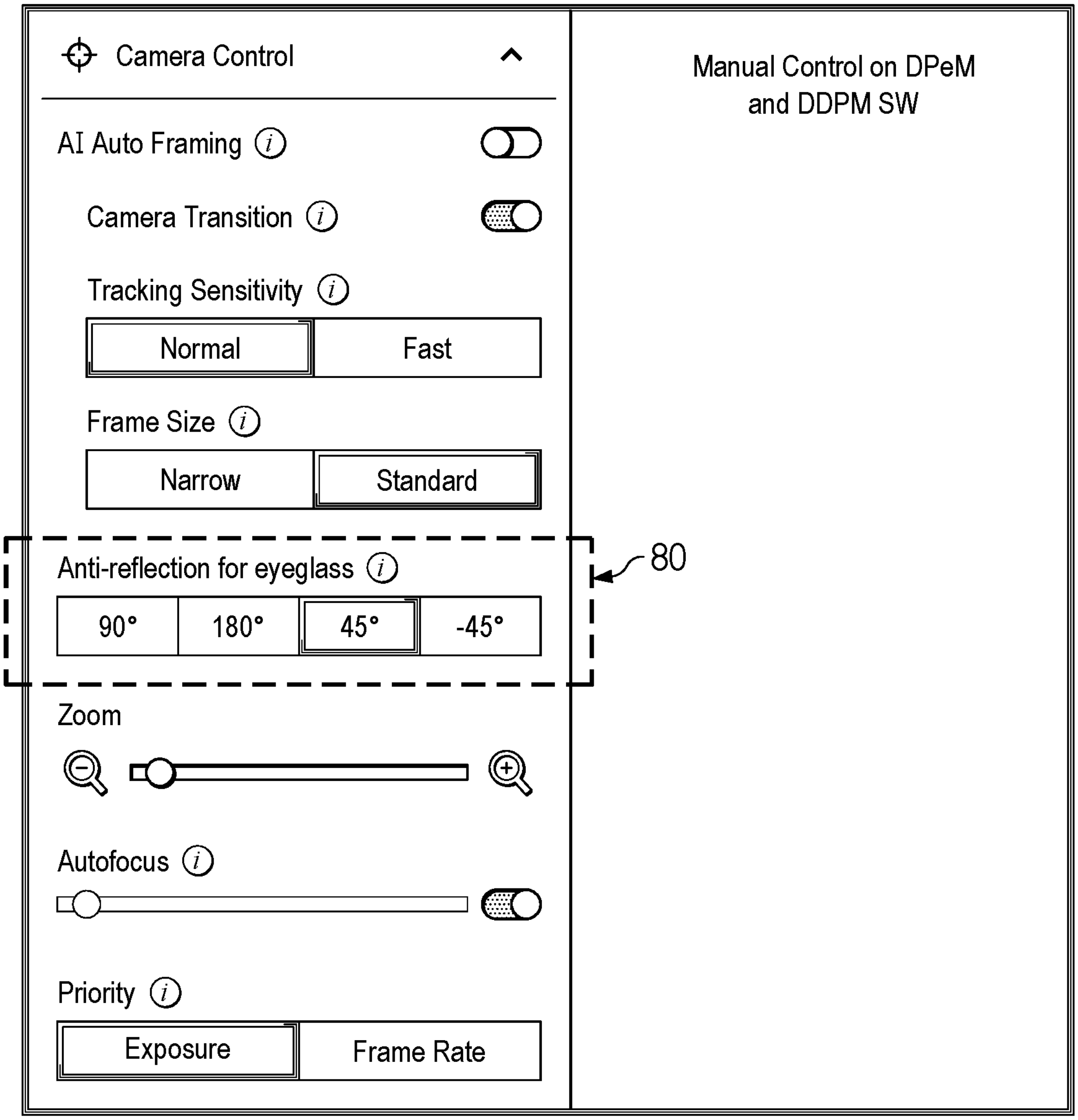
FIG. 6 depicts a graphical user interface of an example of selection of polarization configuration with manual inputs.

Referring now to FIG. 6, a graphical user interface depicts an example of selection of polarization configuration with manual inputs. In the example embodiment, a selection window 80 is presented in the camera control user interface that allows an end user to manually select 90, 180, 45 and −45 degrees of polarization for eyeglass reflection. In an alternative embodiment, an enable and disable option may be included to enable or disable a liquid crystal filter so that the polarizer may be turned off completely. Another option presented at the graphical user interface is turning the polarizer selection to automatic versus manual settings.

Figure 7:
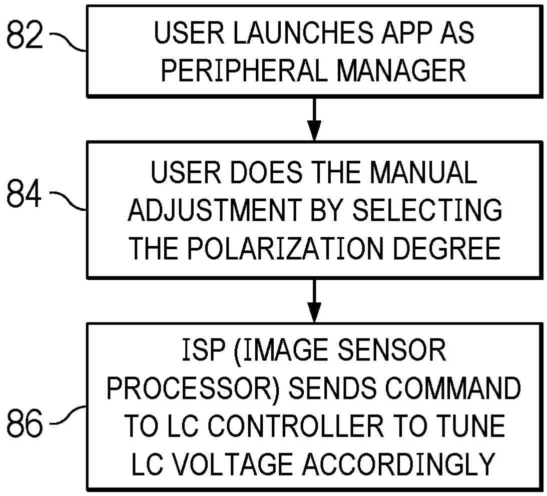
FIG. 7 depicts a flow diagram of a process for manual selection of captured visual image polarization filtering.

Referring now to FIG. 7, a flow diagram depicts a process for manual selection of captured visual image polarization filtering. The process starts at step 82 with launch by an end user of an application for peripheral management that configures the camera. At step 84 the end user does a manual adjustment by selection of the degree of polarization. At step 86 the camera image sensor processor sends a command to the liquid crystal controller to tune the electric charge/voltage for the desired polarization orientation. Although the example embodiment address eyeglass reflections, in alternative embodiments, other types of reflections may be targeted. For example, if a reflection is shown on a mirror or window behind an end user of a displayed visual image, enabling the polarizer may enable the reflection for improved security.

Figure 8:
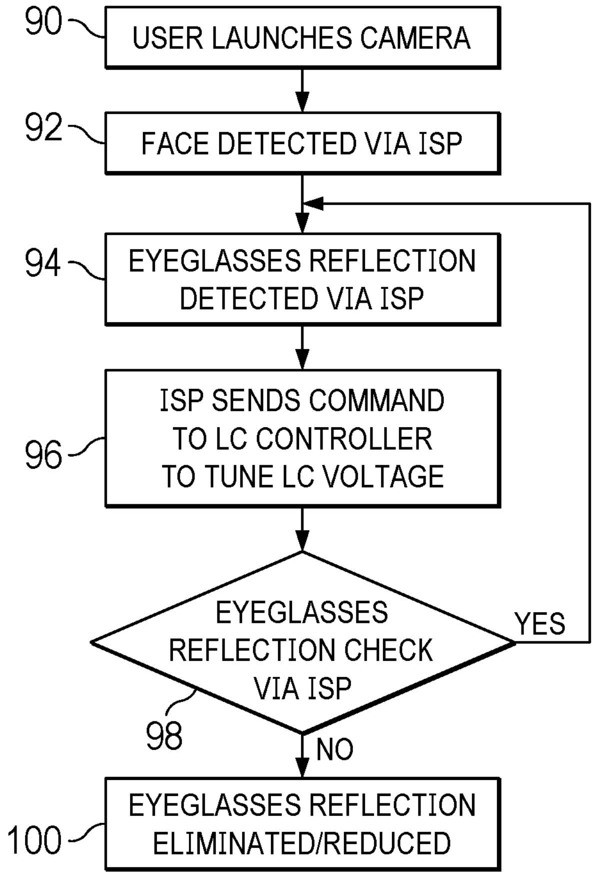
FIG. 8 depicts a flow diagram of a process for automated selection of camera polarization to remove eyeglass reflections.

Referring now to FIG. 8, a flow diagram depicts a process for automated selection of camera polarization to remove eyeglass reflections. The process starts at step 90 with an end user launch of a camera to capture visual images. The process continues to step 92 to detect a face in a visual image captured by the camera. At step 94 eyeglasses worn on the face are analyzed to determine if a reflection is detected. At step 96 the ISP sends a command to the liquid crystal controller to tune the liquid crystal voltage so that the liquid crystals adjust the polarization amount and orientation to reduce the reflection. At step 98 the reflections are again analyzed with the ISP to check if the reflections are below a threshold. If not, the process returns to step 94. In one embodiment, the threshold may be a minimum reflection value that is achieved by iterative rotations of the polarizer orientation. Once the reflections are at the threshold at step 98, the process continues to step 100 to capture visual images with eyeglass reflection eliminated or reduced. In the example embodiment, polarization is disabled unless eyeglass reflection is detected. In alternative embodiments, other types of reflections may be searched for and removed, such as mirror or window reflections.

Although the present invention has been described in detail, it should be understood that various changes, substitutions and alterations can be made hereto without departing from the spirit and scope of the invention as defined by the appended claims.

What is claimed is:

1. An information handling system comprising:

a housing;

a processor disposed in the housing and operable to execute instructions that process information;

a memory disposed in the housing and interfaced with the processor, the memory operable to store the instructions and information;

a display interfaced with the processor and operable to present the information as visual images with light polarized at a first orientation; and a camera having a lens, a processing resource and a non-transitory memory, the camera interfaced with the processor and operable to capture visual images, the lens having a camera polarizer oriented normal the first orientation and activated to filter reflections by polarizing light normal to polarization of reflections of the visual images presented at the display and reflected from surfaces facing the display to the camera and captured in visual images of the camera.

2. The information handling system of claim 1 further comprising:

a display polarizer included in the display to polarize illumination from the display at a first orientation for presentation of the visual images;

wherein the display is a peripheral display separate from the housing, the camera integrates with the peripheral display and the camera polarizer has a second orientation normal the first orientation.

3. The information handling system of claim 1 further comprising:

liquid crystals included with the camera polarizer to selectively enable and disable the camera polarizer to cancel the reflections; and instructions stored in the camera non-transitory memory that when executed on the processing resource cause:

recognition of a reflection in the visual image captured by the camera; and selective enablement of the polarizer in response to the recognition to cancel the reflection.

4. The information handling system of claim 3 wherein the instructions further:

compare the reflection with the camera polarizer enabled and disabled; and in response to the compare, rotate the polarizer axis to increase cancellation of the reflection.

5. The information handling system of claim 3 wherein the reflection comprises a reflection from eyeglasses at a face of an end user viewing the display.

6. The information handling system of claim 5 wherein the instructions further:

determine a brightness of the reflection from the eyeglasses; and enable the polarizer only when the brightness of the reflection exceeds a predetermined amount.

7. The information handling system of claim 1 further comprising instructions stored in the non-transitory memory that when executed on the processing resource cause:

detection of a brightness of the reflection in the camera visual image; and rotation of an orientation of the camera polarizer to reduce the reflection.

8. The information handling system of claim 7 further comprising an actuator coupled to the polarizer to rotate the polarization for rotation of the polarizer orientation.

9. The information handling system of claim 8 wherein the polarizer comprises a layer of liquid crystals that rotate orientation in response to a predetermined current applied to the liquid crystals to remove reflections of polarized light from the eyeglasses.

10. A method for capturing visual images with a camera, the method comprising:

presenting information as visual images at display at a presentation axis with light of the display polarized at a first orientation;

capturing visual images with a camera along the presentation axis;

detecting a reflection of the visual images presented by the display in the visual images captured by the camera; and in response to the detecting, activating a polarizer to filter the reflections by polarizing light normal to the reflection's polarization of the first orientation at the camera to cancel the reflection.

11. The method of claim 10 further comprising:

inserting a layer of liquid crystals at the camera lens along the presentation axis; and applying a current to the liquid crystals to rotate the liquid crystals and activate polarization.

12. The method of claim 11 further comprising:

detecting a brightness of the reflection; and applying the current to change an orientation of the polarization to reduce the brightness of the reflection.

13. The method of claim 10 further comprising:

passing the display visual images through a polarizer of the display having the first orientation; and activating the polarizer of the camera to have a second orientation normal to the first orientation.

14. The method of claim 10 wherein the detecting further comprises:

identifying eyeglasses worn by an end user in the visual images captured by the camera;

determining a brightness threshold of a reflection of the eyeglasses; and in response to the brightness threshold, activating the polarizer.

15. The method of claim 14 wherein the brightness threshold of the eyeglasses comprises visibility of eyes of the end user behind the eyeglasses.

16. A camera comprising:

a lens;

a processing resource;

a polarizer aligned with the lens; and a non-transitory memory interfaced with the processing resource and storing instructions that when executed on the processing resource cause:

capture of visual images from light passing through the lens;

detection of an end user wearing eyeglasses in the visual images; and activation of a polarizer associated with the lens to cancel reflections from the eyeglasses by filtering the reflections by polarizing light normal to the reflection's polarization.

17. The camera of claim 16 wherein the polarizer comprises a layer of liquid crystals selectively activated to polarize light by a charge.

18. The camera of claim 17 wherein the instructions further adjust an orientation of the liquid crystals that are activated to change the orientation of light polarized by the liquid crystals.

19. The camera of claim 16 further comprising:

a display panel configured to present visual images through a display panel polarizer; and a housing coupling the display panel and camera into an assembly;

wherein the camera polarizer polarizes light in an orientation normal to the display panel polarizer.

20. The camera of claim 16 further comprising:

activating the polarizer when the reflection blocks visibility of the end user eyes by a predetermined amount.

* * * * *